United States Patent
Sherwin et al.

(10) Patent No.: US 10,810,575 B2
(45) Date of Patent: Oct. 20, 2020

(54) METHOD AND/OR SYSTEM FOR EXTENDING PAYMENT SYSTEM ARCHITECTURES AND/OR LEGACY ORDER PROCESSING SYSTEMS TO MOBILE COMMERCE APPLICATIONS VIA TEXT MESSAGING

(71) Applicant: CardinalCommerce Corporation, Mentor, OH (US)

(72) Inventors: Francis Sherwin, Shaker Heights, OH (US); Chandra S. Balasubramanian, Shaker Heights, OH (US)

(73) Assignee: CardinalCommerce Corporation, Mentor, OH (US)

( * ) Notice: Subject to any disclaimer, the term of this patent is extended or adjusted under 35 U.S.C. 154(b) by 191 days.

(21) Appl. No.: 16/166,464

(22) Filed: Oct. 22, 2018

(65) Prior Publication Data

US 2019/0057375 A1    Feb. 21, 2019

Related U.S. Application Data

(60) Continuation of application No. 15/586,866, filed on May 4, 2017, now Pat. No. 10,140,608, which is a
(Continued)

(51) Int. Cl.
G06Q 30/00 (2012.01)
G06Q 20/32 (2012.01)
(Continued)

(52) U.S. Cl.
CPC ......... *G06Q 20/3255* (2013.01); *G06Q 20/12* (2013.01); *G06Q 20/32* (2013.01);
(Continued)

(58) Field of Classification Search
None
See application file for complete search history.

(56) References Cited

U.S. PATENT DOCUMENTS

| 2002/0028686 A1 | 3/2002 | Kagi |
| 2002/0143655 A1 | 10/2002 | Elston et al. |

(Continued)

FOREIGN PATENT DOCUMENTS

| EP | 1182594 A1 | 2/2002 |
| JP | 2000501270 A | 2/2000 |

(Continued)

OTHER PUBLICATIONS

Progress Partners Awarded for Stellar Growth and Collaborative Efforts; Business Wire. New York: Feb. 11, 2004. p. 1; http//proquest.umi.com.

*Primary Examiner* — Mila Airapetian
(74) *Attorney, Agent, or Firm* — The Webb Law Firm

(57) ABSTRACT

A text message order processing system includes: means for receiving text messages from consumers purchasing products from one or more merchants, each of the text messages being addressed to an address selected by the consumer and including an identification of the product being purchased and an identification of a device from which the text message was sent; means for parsing each text messages to extract the identification of the product and the identification of the device from the text massage; means for selecting based upon each received text message a payment instrument to be used to pay for the purchase; means for establishing payment information related to the selected payment instrument and delivery information indicating where the purchased product is to be delivered; means for generating for each received text message an order including the established payment information, delivery information and
(Continued)

identification of the product being purchased; and, means for submitting the generated order to an order management system of the merchant.

8 Claims, 3 Drawing Sheets

Related U.S. Application Data continuation of application No. 14/324,490, filed on Jul. 7, 2014, now Pat. No. 9,667,587, which is a division of application No. 13/476,397, filed on May 21, 2012, now Pat. No. 8,775,265, which is a continuation of application No. 12/986,388, filed on Jan. 7, 2011, now Pat. No. 8,185,447, which is a division of application No. 11/492,384, filed on Jul. 25, 2006, now Pat. No. 7,877,296.

(60) Provisional application No. 60/702,165, filed on Jul. 25, 2005.

(51) Int. Cl.
*G06Q 20/12* (2012.01)
*G06Q 30/06* (2012.01)
*H04L 12/58* (2006.01)

(52) U.S. Cl.
CPC ........ *G06Q 20/322* (2013.01); *G06Q 30/06* (2013.01); *G06Q 30/0601* (2013.01); *G06Q 30/0609* (2013.01); *G06Q 30/0613* (2013.01); *G06Q 30/0633* (2013.01); *H04L 51/18* (2013.01); *H04L 51/38* (2013.01); *H04L 2463/102* (2013.01)

(56) References Cited

U.S. PATENT DOCUMENTS

| | | |
|---|---|---|
| 2002/0187774 A1 | 12/2002 | Ritter et al. |
| 2004/0019564 A1 | 1/2004 | Goldthwaite et al. |
| 2004/0125955 A1 | 7/2004 | Murray |
| 2004/0203406 A1* | 10/2004 | Moran .............. H04W 48/16 455/66.1 |
| 2005/0055327 A1 | 3/2005 | Agrawal et al. |
| 2005/0060250 A1 | 3/2005 | Heller et al. |
| 2005/0071238 A1 | 3/2005 | Guillot |
| 2005/0131837 A1 | 6/2005 | Sanctis et al. |
| 2006/0085335 A1 | 4/2006 | Crawford et al. |
| 2006/0173741 A1 | 8/2006 | Marshal |
| 2006/0194572 A1* | 8/2006 | Fresonke ............. G06Q 30/00 455/414.1 |
| 2006/0213968 A1 | 9/2006 | Guest et al. |
| 2006/0218613 A1 | 9/2006 | Bushnell |
| 2007/0241189 A1 | 10/2007 | Slavin et al. |
| 2009/0144624 A1 | 6/2009 | Barnes, Jr. |
| 2011/0087528 A1 | 4/2011 | Matsuda et al. |

FOREIGN PATENT DOCUMENTS

| | | |
|---|---|---|
| JP | 2001266013 A | 9/2001 |
| JP | 2001282998 A | 10/2001 |
| JP | 2001517841 A | 10/2001 |
| JP | 2002501232 A | 1/2002 |
| JP | 2002117355 A | 4/2002 |
| JP | 2002207934 A | 7/2002 |
| JP | 2002352012 A | 12/2002 |
| JP | 2002352164 A | 12/2002 |
| JP | 2003115022 A | 4/2003 |
| JP | 2003515295 A | 4/2003 |
| JP | 2003150834 A | 5/2003 |
| JP | 2003233763 A | 8/2003 |
| JP | 2004080818 A | 3/2004 |
| JP | 2005517247 A | 6/2005 |
| JP | 2008503146 A | 1/2008 |
| JP | 2008535004 A | 8/2008 |
| WO | 199811744 | 3/1998 |
| WO | 9916029 A1 | 4/1999 |
| WO | 199935595 | 7/1999 |
| WO | 9967938 | 12/1999 |
| WO | 0113298 A2 | 2/2001 |
| WO | 2003067493 | 8/2003 |
| WO | 2005001728 | 1/2005 |
| WO | 2005125125 | 12/2005 |
| WO | 2006102448 | 9/2006 |

* cited by examiner

METHOD AND/OR SYSTEM FOR EXTENDING PAYMENT SYSTEM ARCHITECTURES AND/OR LEGACY ORDER PROCESSING SYSTEMS TO MOBILE COMMERCE APPLICATIONS VIA TEXT MESSAGING

CROSS REFERENCE TO RELATED APPLICATIONS

This application is a continuation of application Ser. No. 15/586,866, filed May 4, 2017, which is a continuation of application Ser. No. 14/324,490, filed Jul. 7, 2014, and issued as U.S. Pat. No. 9,667,587, which is a divisional of application Ser. No. 13/476,397, filed May 21, 2012, and issued as U.S. Pat. No. 8,775,265, which is a continuation of application Ser. No. 12/986,388, filed Jan. 7, 2011, and issued as U.S. Pat. No. 8,185,447, which is a divisional of application Ser. No. 11/492,384, filed Jul. 25, 2006, and issued as U.S. Pat. No. 7,877,296, which claims the benefit of U.S. Provisional Application No. 60/702,165, filed Jul. 25, 2005.

FIELD

The present inventive subject matter relates to the art of mobile commerce. One particular application is found in conjunction with a mobile telecommunication device used to conduct authenticated transactions, and the specification makes particular reference thereto. However, it is to be appreciated that aspects of the present inventive subject matter are also amenable to other like applications.

BACKGROUND

The general purpose of the present inventive subject matter is to provide a system and/or method that allows consumers to securely purchase items or carry out commercial or other similar transactions in real time using mobile telephones or other similar devices to text message (e.g., via a short message service (SMS) or the like) instructions for a particular purchase or order to a designated address or other like destination.

Commonly, merchants (or their proxies) employ various channels, e.g., shop-from-home television networks, general television programming and/or advertising, radio broadcasts and/or advertising, catalog shopping and/or other similar channels, to sell their goods and/or service. Commercial transactions resulting from the aforementioned channels have in the past been typically carried out using traditional mail order/telephone order (MOTO) systems, Internet based ordering and/or purchasing systems, and the like. Many of such merchants are not equipped to interpret or accept text message purchase instructions or orders. Accordingly, the present inventive subject matter provides a way in which text message initiated transactions (i.e., purchases and/or orders) may be processed for merchants that are otherwise not equipped to interpret the text message instructions.

SUMMARY

A suitable embodiment of the present inventive subject matter leverages the current mobile telephone and/or SMS architecture as well as current electronic payment methods (e.g. Visa®, MasterCard®, American Express®, Discover®, JCB®, PayPal®, private label accounts, etc.) processing architectures and legacy payment systems to allow secure transactions to be carried out over these legacy systems that have been initiated via an SMS message using a mobile or other SMS enabled device. In one embodiment, a consumer, in possession of a PayPal® or other like payment account, while viewing products being sold on a shop-from-home television network, initiates a purchase transaction by sending payment instructions via SMS to an SMS shortcode (or some other like address, telephone number or some similar destination identifier) appearing on the television screen. Suitably, a system for processing the instructions receives that SMS message and passes appropriate information into the shop-from-home network's legacy order processing and/or management system. This information can include identifying information about the consumer (e.g., name, address, telephone number) as well as suitable payment information. Optionally, the system also communicates with a payment method processing system or network and returns a request to the consumer via SMS to reply with their password or personal identification number (PIN), thereby helping to ensure the security of the transaction, at which time the payment processing system authorizes the transaction or rejects it based on whether the password and/or PIN is valid, whether sufficient funds are available and/or other considerations. Suitably, once the authorization and payment process has been completed, notification of the successful or unsuccessful completion of the transaction is passed back to the consumer via an SMS message.

Alternate embodiments include, but are not limited to iterations enabling SMS initiated transactions for products advertised on television, paid television programs (infomercials), products featured in general television programming segments, products advertised in radio programming, catalog or print media and/or advertising, etc.

In accordance with one embodiment, a method of conducting a commercial transaction includes: receiving a text message from a first party purchasing a product from a second party, the text message being addressed to an address selected by the first party and including an identification of the product being purchased and an identification of a device from which the text message was sent; parsing the text message to extract the identification of the product and the identification of the device from the text massage; selecting based upon the received text message a payment instrument to be used to pay for the purchase; establishing payment information related to the selected payment instrument and delivery information indicating where the purchased product is to be delivered; generating an order including the established payment information, delivery information and identification of the product being purchased; and, submitting the generated order to an order management system of the second party.

In accordance with another embodiment, a text message order processing system including: means for receiving text messages from consumers purchasing products from one or more merchants, each of the text messages being addressed to an address selected by the consumer and including an identification of the product being purchased and an identification of a device from which the text message was sent; means for parsing each text messages to extract the identification of the product and the identification of the device from the text massage; means for selecting based upon each received text message a payment instrument to be used to pay for the purchase; means for establishing payment information related to the selected payment instrument and delivery information indicating where the purchased product is to be delivered; means for generating for each received text message an order including the established payment information, delivery information and identification of the product being purchased; and, means for submitting the generated order to an order management system of the merchant.

In accordance with another embodiment, a method of processing a text message includes: receiving a first text message from a first party, the first text message including an identification of information being sought by the first party; generating a request for the identified information, the request being in a format other than a text message format; submitting the request to a server having access to the identified information; obtaining the identified information from the server, the obtained information being in a format other than a text message format; including the obtaining information in a second text message; and, a sending the second text message back to the first party.

In accordance with another embodiment, a method of conducting a commercial transaction includes: receiving a text message from a first party making a purchase from a second party; identifying based upon the received text message a payment account of the first party to be used to pay for the purchase; sending a communication to a third party that maintains the payment account for the first party to determine if the payment account has sufficient funds available to make the purchase; and if sufficient funds are available, then instructing the third party to reserve those funds, generating an order for the purchase, submitting the generated order to the second party, assuming an obligation to pay for the order on behalf of the first party, and seeking restitution for the obligation to pay for the order out of the reserved funds.

Numerous advantages and benefits of the inventive subject matter disclosed herein will become apparent to those of ordinary skill in the art upon reading and understanding the present specification.

BRIEF DESCRIPTION OF THE DRAWINGS

The present inventive subject matter may take form in various components and arrangements of components, and in various steps and arrangements of steps. The drawings are only for purposes of illustrating preferred embodiments and are not to be construed as limiting. Further, it is to be appreciated that the drawings are not to scale.

DETAILED DESCRIPTION OF PREFERRED EMBODIMENTS

Figure 1:
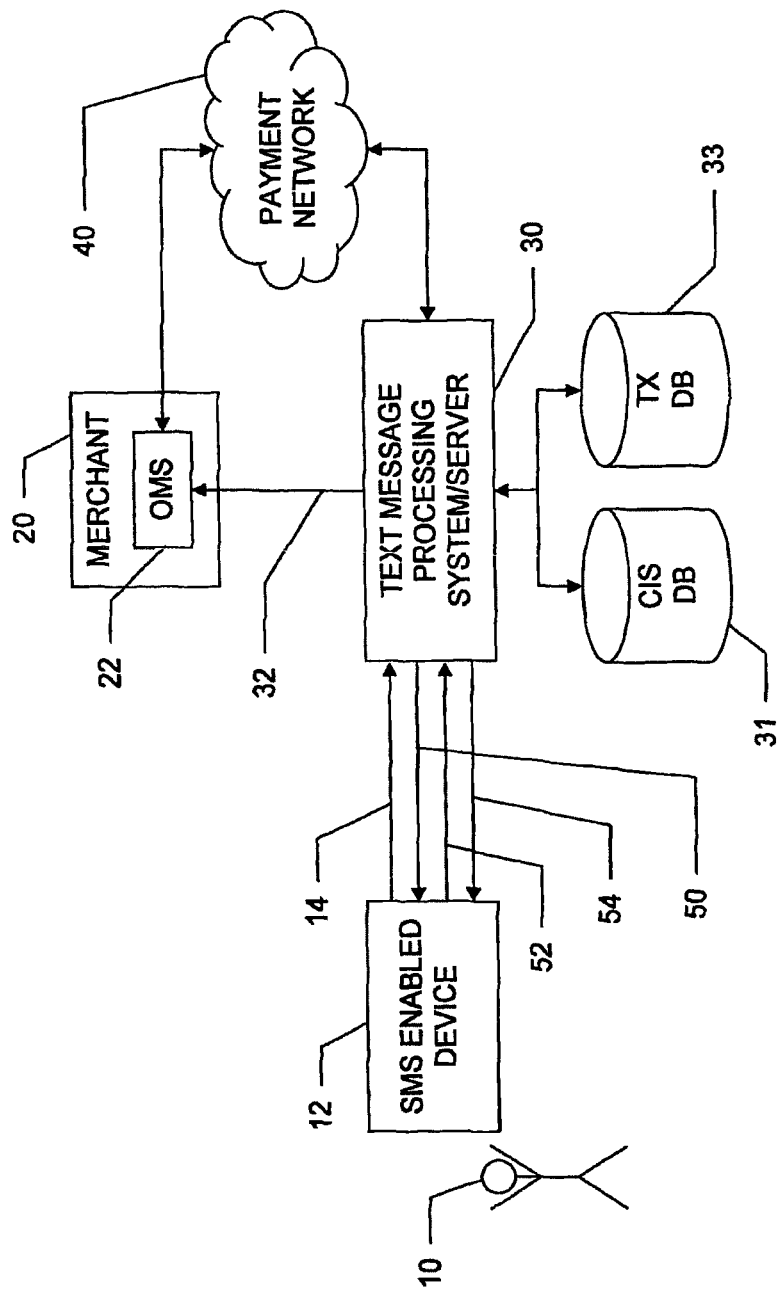
FIG. 1 is a diagrammatic illustration showing a transaction processing system embodying aspects of the present inventive subject matter.

With reference to FIG. 1, a consumer 10 (which when referred to herein shall include any purchaser) employs a device 12 to initiate a commercial transaction, e.g., to make a purchase or place an order. The purchase or order is optionally for any one or more desired products (which when referred to herein shall also include services) offered for sale by a merchant 20 (which when referred to herein shall include any seller or their agent or proxy). Suitably, the purchased product or products are optionally presented for sale to the consumer 10 via a suitable media and/or sales channel. For example, the products may be presented on a television tuned to a shop-from-home network or an infomercial or a television advertisement or another television program; or they may be presented via a radio program or advertisement; or they may be presented in a catalog or print advertisement; etc.

In a suitable embodiment, the device 12 is a mobile telephone or other like device equipped or otherwise enabled to send and/or receive text messages, e.g., via SMS or another like text message service or protocol. Suitably, the purchase is made or the order placed by the consumer 10 appropriately manipulating or otherwise using the device 12 to send a text message 14 to a designated destination identified, e.g., by an SMS shortcode, a telephone number, or some other appropriate text message destination address. In the usual manner, when the text message 14 is sent, it includes in a header or the like or is otherwise packaged or associated with an origination identifier (ID) that indicates where or which device the message 14 originated from. For example, where the device 12 is a mobile telephone, the origination ID is optionally the telephone number assigned to or otherwise associated with the device 12.

As shown in FIG. 1, the message 14 is received by a text message purchase and/or order processing system 30 that serves the merchant 20. Suitably, the system 30 is implemented as a server or other appropriate computer (including the typical adjunct components thereof, e.g., memory, data storage devices, central processing unit, etc.) that executes software instructions and/or supports one or more computer programs running thereon, so as to carry out the functions, operations and/or processes described herein as being performed by the system 30. While FIG. 1 shows the system 30 serving only one merchant 20 for purposes of simplicity and clarity herein, it is to be appreciated that the system 30 in practice serves a plurality of merchants (i.e., one or more) similarly equipped and/or situated. Suitably, the system 30 is provisioned with one or more separate SMS shortcodes or other text message addresses for each merchant served. Accordingly, the system 30 differentiates and/or identifies which merchant a particular received text message 14 relates to based upon the particular SMS shortcode or other like destination ID to which the text message 14 is addressed. Alternately, one or more merchants may share a common shortcode or destination address, in which case, the consumer 10 includes in the body of the text message 14 a key word or other identifier that specifies the merchant to which the text message 14 relates.

The body of the text message 14 also optionally includes order instructions, delivery instructions and/or payment instructions. The order instructions suitably identify the product or products being purchased (e.g., using a designated product code, product description or the like) and optionally a quantity. The delivery instructions suitably identify an address or other like destination indicating where the purchased products are to be delivered. The payment instructions optionally identify a type of payment instrument or payment method being used (e.g. Visa®, MasterCard®, American Express®, Discover®, JCB®, PayPal®, a private label account, etc.), a card or account number or a user name associated with the account, a card expiration date, a billing address associated with the payment instrument or account, an account holder's name, etc.

Optionally, the system 30 includes or otherwise has access to a customer information system (CIS) database (DB) 31 in which certain information relating to the consumer 10 is maintained. Accordingly, by having this information "on file," it may be omitted from the text message 14. Suitably, the consumer 10 is optionally identified by the system 30 based upon the origination ID included or otherwise associated with the received text message 14. For example, when the device 12 is a mobile telephone, the consumer 10 may be identified based upon the telephone number from which the text message 14 originated. The CIS DB 31 is optionally accessed to obtain the relevant information for the identified consumer 10, e.g., the consumer's name, their delivery and/or billing addresses, etc. Additionally, the consumer may optionally have one or more payment instruments and/or method associated with their record or file in the CIS DB 31, including the relevant information associated therewith. Accordingly, when the consumer 10 sends the text message 14 they may merely have to identify which of the payment instruments/methods on record should be used for the particular purchase. Of course, if only one payment instrument/method is on record in the CIS DB 31 for the consumer 10, then that payment instrument/method and/or its associated payment information may be used by default, or one of multiple payment instruments/methods on record may be designated as the default.

In one suitable embodiment, the relevant information to be included in the text message 14 by the consumer 10 is supplied on or in the media presentation providing the purchased product for sale to the consumer 10. That is to say, the media presentation may optionally communicate to the consumer 10 what information to include in the text message 14 and where the text message 14 is to be sent. For example, the media presentation may show and/or announce "to purchase item X, text product code A1B2 to the SMS shortcode 555123." The format of the data, which data is to be included and/or the order in which the data is to be included in the body of the text message may be communicated to the consumer 10 via the media presentation, or it may be prearranged or otherwise determined, or some combination thereof.

Upon receipt of the text message 14, it is parsed by the system 30 and the particular information and/or data elements are identified. Therefrom, an appropriate order 32 is prepared by the system 30 and the order 32 is submitted to an order processing system or order management system (OMS) 22 of the merchant 20. Suitably, the OMS 22 is a traditional or legacy OMS into which the merchant enters traditional MOTO transactions in the usual manner, and the order 32 is submitted directly thereto from the system 30. Suitably, for the OMS 22 to properly process an order, the order preferably includes or contains the relevant purchase or order information which is organized and/or formatted in a particular manner designated by the particular OMS, e.g., the orders may include a number of fields that are populated with the appropriate data elements. Accordingly, the system 30 arranges, translates and/or otherwise manipulates the data elements or information received from the text message 14 (and/or where appropriate obtained from the CIS DB 31) such that the order 32 conforms to the designated format appropriate for the OMS 22 to which it is being sent. For example, the system 30 optionally formats particular data elements received in the text message 14 or obtained from the CIS DB 31 and enters them into the appropriate fields designated by the OMS 22 so that the order 32 conforms thereto.

As shown in FIG. 1, the OMS 22 processes orders and submits the transactions for payment processing in the usual manner to a payment system or network 40 that corresponds to the payment instrument or method employed for the respective purchase. Optionally, with certain types of transaction and/or for particular payment methods, the system 30 is further engaged to assist in the payment processing. For example, some transactions may involve an authentication protocol or initiative prescribed by the payment network 40 or the payment method may be such that additional security information or authentication credentials are sought from the consumer 10 to complete the payment processing. Such authentication protocols (e.g., Visa's 3-D Secure®, a.k.a. Verified by Visa (VbV), MasterCard's SecureCode®, and the like) are described in U.S. Provisional Patent Application No. 60/647,883, filed Jan. 28, 2005, and U.S. patent application Ser. No. 11/340,887, filed Jan. 27, 2006, which are both incorporated herein by reference in their entirety. Other payment methods (e.g., PayPal®), similarly may similarly seek authentication credentials (e.g., a password or the like) from the consumer 10 prior to authenticating or authorizing a transaction.

In general, the system 30 retrieves or otherwise requests the desired authentication credentials from the consumer 10 and returns them to the payment network 40. Optionally, any authentication results generated by the payment network 40 are then obtained by the system 30 from the payment network 40 and forwarded to the consumer 10. Suitably, in this capacity, the system 30 is implemented and/or functions essentially as described in the aforementioned Provisional U.S. Patent Application 60/647,883 and/or U.S. patent application Ser. No. 11/340,887.

With reference to FIG. 1, in a suitable embodiment, the payment network 40 signals the system 30 or the system 30 is otherwise prompted to obtain authentication credentials from the consumer 10. In response thereto, the system 30 sends an SMS or other text message 50 to the device 12 requesting that consumer 10 reply with the appropriate credentials (e.g., a password, PIN, etc.). The consumer 10 then manipulates or otherwise employs the device 12 to return an SMS or other text message 52 to the system 30, e.g., including therein the requested credentials. Having received the text message 52, the system 30 parses the message 52 and/or identifies the credentials returned by the consumer 10. These returned credentials are then optionally formatted and/or otherwise appropriately arranged as designated or expected by the payment network 40, and they are forwarded thereto. Suitably, based on the credentials received by the payment network 40 from the system 30, an authentication and/or authorization determination is made. Optionally, the system 30 retrieves or otherwise obtains the resulting determination from the payment network 30, formats the same into an SMS or other text message 54, and forwards the message 54 to the device 12 for receipt by the consumer 10. Alternately, the system 30 may be equipped with or have access to an interactive voice response (IVR) system which is employed to request the authentication credentials from the consumer 10 (e.g., via a voice telephone call placed to the device 12 which is implemented as a mobile telephone). Similarly, the IVR system may also optionally be employed to return the resulting determination to the consumer 10.

As can be appreciated from FIG. 1, in connection with any given type of transaction, often multiple text, SMS or other like messages (e.g., messages 14, 50, 52 and 54) are exchanged between the device 12 and the system 30 to complete the transaction. Additionally, depending upon the particular type of transaction, there may be an exchange of multiple messages between the device 12 and the system 30 before a completed order 32 can be submitted to the OMS 22. For example, the information contained in message 14 may alternately be acquired by the system 30 via a plurality of separate queries and replies, or authentication may be executed before the order 32 is submitted. However, conventionally such messages are "session free." That is to say, in conventional text messaging there is no dedicated session established between the message sending and message receiving nodes. Rather, each message is essentially an autonomous communication.

Accordingly, it is desirable to recognize and/or group messages related to the same transaction to avoid confusion, e.g., if the same consumer 10 or device 12 is engaged in multiple transactions at the same time. More specifically, for example, a second transaction may be started by sending a second text message 14 before the first transaction is concluded by the sending of the message 54. In this case, it becomes desirable, for example, to determine if a reply received by the system 30 from the device 12 relates to the first transaction or the second transaction.

In one suitable embodiment, the system 30 includes or otherwise has access to and/or maintains a transaction (TX) DB 33. In the TX DB 33 various messages exchanged between the device 12 and the system 30 are stored, organized and/or grouped, for example, into records or the like according to the particular transaction to which they relate. For example, when the system 30 receives the message 14 initiating a new transaction, it is assigned a unique TX ID or other like identifier and it is stored or otherwise recorded in the TX DB 33 under or otherwise indexed by this identifier. Similarly, the corresponding message 52 sent from the system 30 to the device 12 is likewise recorded in the TX DB 33 using the established TX ID, and so on for messages 54 and 56. In this manner, the plurality of otherwise autonomous messages relating to one particular transaction are linked or chained together. Moreover, based on the particular type of transaction as determined from one or more of the previously exchanged messages corresponding to the same TX ID, the system 30 is able to know or predict the form and/or type of message that is expected next for that particular transaction. That is to say, by link or chaining the messages together in this manner, the system 30 is able to recognized where in the process a transaction is, i.e., how far the transaction has progressed at a given point in time. For example, at a particular point during a transaction, based upon one or more messages already recorded in the TX DB 33 under the given TX ID, the system 30 knows to expect authentication credentials or some other allowable form or type of reply or message from the device 12. Accordingly, if the consumer 10 or device 12 is engaged in multiple transactions, based upon the form or type of message received from the device 12, the system 30 is able to identify which transaction the message belongs to and record it in the TX DB 33 under or index by the proper TX ID. Moreover, for a given transaction, if an expected message is not received within a set or otherwise determined period of time, the system 30 may optionally "time out" or otherwise consider that transaction void.

Figure 2:
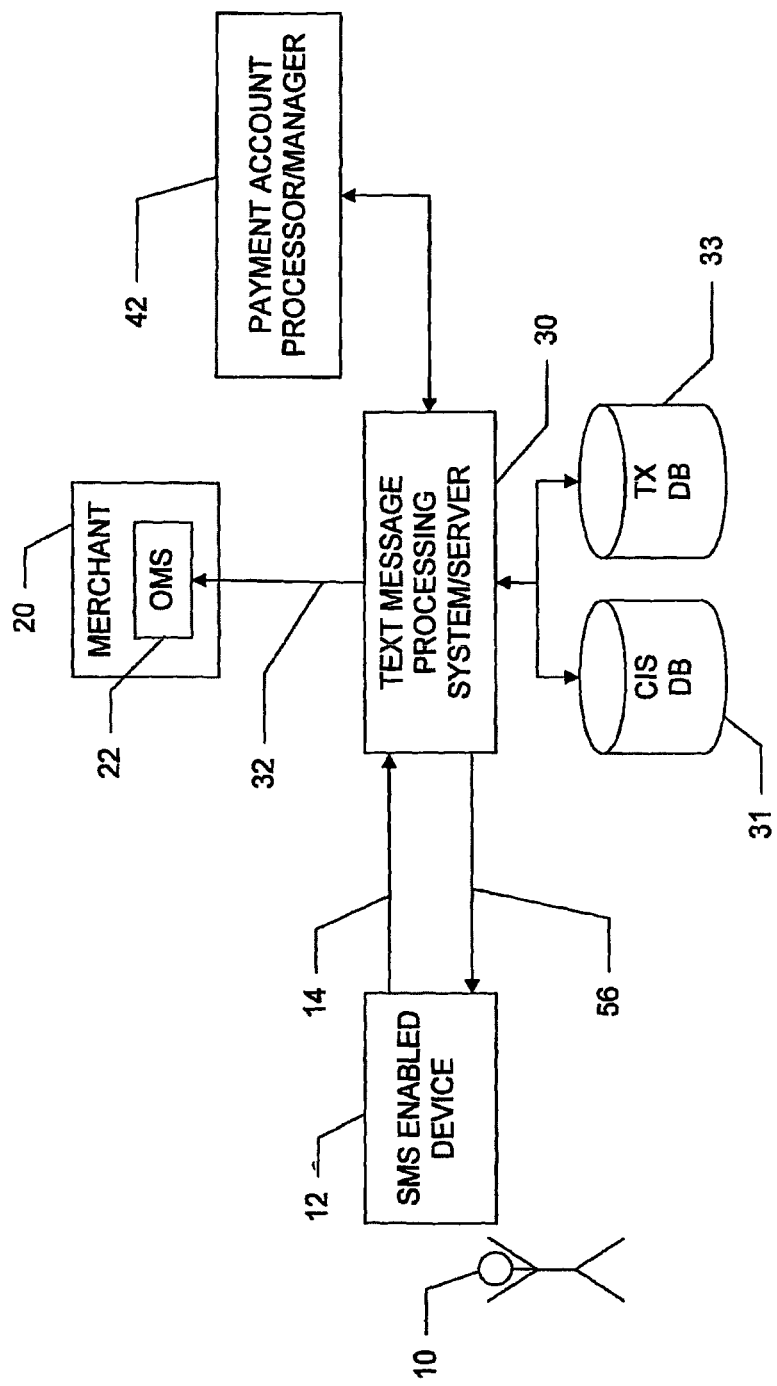
FIG. 2 is a diagrammatic illustration showing an alternate embodiment of a transaction processing system embodying aspects of the present inventive subject matter.

With reference to FIG. 2, suitably the text message processing system/server 30 is also provisioned to function without accessing the payment network. For example, as illustrated, the system 30 directly connects or otherwise communicates with a payment account processor or manager 42 which maintains an account for the consumer 10. For example, the payment account processor/manager 42 may maintain for the consumer 10 a prepaid credit card account or a deposit account or other similarly funded account. Accordingly, when the text message 14 is received by the system 30, if it identifies a payment account maintained by the processor/manager 42, then the system communicates with processor/manager 42 to determine if sufficient funds are available to cover the purchase amount. Assuming the payment account is sufficiently funded, the processor/manager 42 is instructed by the system 30 to set aside the purchase amount from the remainder of the account funds (i.e., so as to be otherwise unusable), and the order 32 is placed to the merchant 20. Suitably, the order 32 still identifies the delivery destination as corresponding to the consumer 10 (e.g., either as indicated in the message 14 or as obtained from the CIS DB 32). However, in this embodiment, the owner or operator of the system 30 assumes the payment obligation on behalf of the consumer 10 and seeks reimbursement therefor from the processor/manager 42, i.e., out of the set aside funds. For example, the payment to the merchant 20 and the reimbursement from the processor/manager 42 is optionally automatically carried out via an electronic funds transfer or the like. Depending upon the relationship between the parties or agreed upon terms, the foregoing settlement may be conducted on a per transaction basis or in batches at scheduled or otherwise determined intervals.

Suitably, as illustrated in FIG. 2, certain products and/or services purchased from the merchant 20, may be amenable to "electronic delivery" via a text, SMS or other like message. Accordingly, optionally, the system 30 obtains the item to be delivered from the merchant 20 and formats and sends a suitable message 56 to the device 12. More specifically, for example, the merchant 20 may sell wireless PINs (personal identification numbers) used to obtain wireless airtime, calling card minutes or the like. Accordingly, the wireless PIN or access code or call card number or the like is optionally obtained by the system 30 at or about the time the purchase is made, and sent from the system 30 to the device 12 in the text, SMS or other like message 56.

Figure 3:
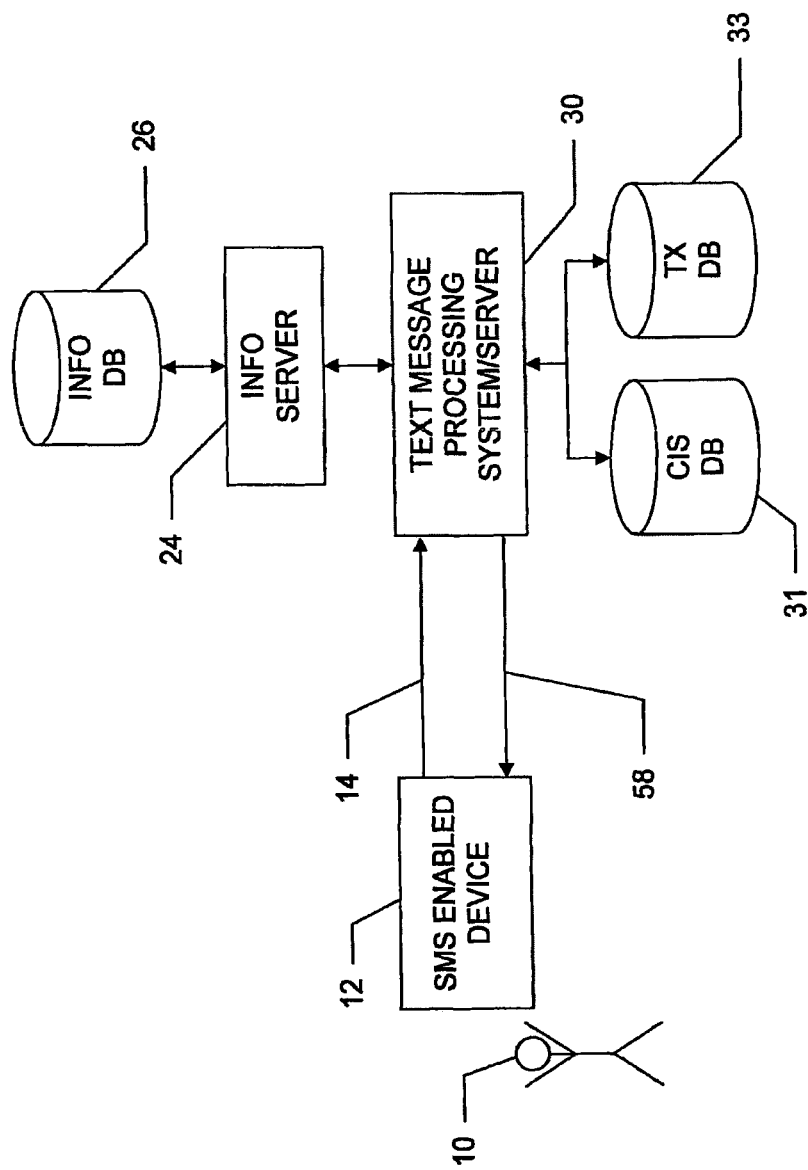
FIG. 3 is a diagrammatic illustration showing another alternate embodiment of a transaction processing system embodying aspects of the present inventive subject matter.

With reference to FIG. 3, the text message processing system/server 30 is also optionally provisioned to support non-commercial transactions or activities, e.g., such as obtaining requested information from a DB. As illustrated, the system 30 is operatively connected to or in communication with an information server 24, e.g., which is a legacy information server such as a web server, DB server, some combination thereof or the like. Suitably, the information server 24 includes or otherwise has access to an information DB 26, and upon request provides information therefrom in other than a text message or SMS format, e.g., as web pages or the like. Moreover, suitably the server 24 is not provisioned to receive and/or interpret text or SMS messages.

Accordingly, in the present embodiment, suitably, the text message 14 includes a requested for selected information from the DB 26. In, response to the received text message 14, the system 30 parses the message 14 to identify the request and formats and sends an appropriate signal or communication to server 24 to obtain the requested information therefrom. Having obtained the requested information, the system 30 then formats and/or otherwise includes the requested information in a text, SMS or other like message 58 which is returned to the device 12. As can be appreciated the present embodiment has many applications, e.g., the present embodiment is optionally implemented to support mobile banking, i.e., to conduct balance inquires or otherwise check the status of an account or to obtain other account information which may be stored in the DB 26. Optionally, in addition to merely requesting and/or obtaining information, the system 30 is optionally provisioned and/or used to manipulate information, e.g., the transfer funds from one bank account to another or the like. Accordingly, rather than message 14 including an information request, it includes instructions to achieve a selected manipulation of the information.

Of course, while not explicitly illustrated in FIG. 2 or 3, it is to be appreciated that authentication may still be carried out, e.g., optionally in a manner similar to that described with reference to FIG. 1. However, in any case, alternate authentication protocols may also optionally be implemented.

Suitably, the authentication infrastructure supported by the system 30 optionally uses different authentication technologies based on the type of transaction that is being processed. For example, the message 52 containing the authentication credentials is separate from the message 14 originating the transaction. The authentication credential request 50 and response message 52 are optionally exchanged using two different SMS Centers (SMSCs). Suitably, to force the response message 52 to use an SMSC different from the one used by message 50, the "reply to addresses" in the SMS header of the message 50 is set to a different SMSC address. Operating in this manner with two different SMSCs allows for higher transactional security, particularly in the case of sensitive authentication credentials.

In connection with the particular exemplary embodiments presented herein, certain structural and/or function features are described as being incorporated in particular embodiments. It is to be appreciated that different aspects of the exemplary embodiments may be selectively employed as appropriate to achieve other alternate embodiments suited for desired applications, the other alternate embodiments thereby realizing the respective advantages of the aspects incorporated therein.

Additionally, it is to be appreciated that certain elements described herein as incorporated together may under suitable circumstances be stand-alone elements or otherwise divided. Similarly, a plurality of particular functions described as being carried out by one particular element may be carried out by a plurality of distinct elements acting independently to carry out individual functions, or certain individual functions may be split-up and carried out by a plurality of distinct elements acting in concert. Alternately, some elements or components otherwise described and/or shown herein as distinct from one another may be physically or functionally combined where appropriate.

In short, the present specification has been set forth with reference to exemplary embodiments. Obviously, modifications and alterations will occur to others upon reading and understanding the present specification. It is intended that the inventive subject matter be construed as including all such modifications and alterations insofar as they come within the scope of the appended claims or the equivalents thereof.

What is claimed is:

1. A mobile communication device system comprising:
   a mobile communication processor programmed or configured to:
   send a first text message from the mobile communication device to a text message processing server, the first text message comprising an identification of information being sought by the party and instructions to manipulate the identified information, wherein the first text message is in short message service (SMS) format;
   receive a second text message from the text message processing server comprising at least one processor programmed or configured to: when two or more merchants share a common shortcode, identify a particular merchant by a keyword in a body of the first text message, parse the first text message to identify the information being sought by the party, generate a request for the identified information and manipulate the identified information in accordance with the instructions, the request being in a format other than a text message format, submit the request to an information server having access to the identified information, obtain the identified information as manipulated from the information server, the obtained information being in a format other than a text message format, and include the obtained information in the second text message; and
   process and display at least a portion of the information being sought by the party on the mobile communication device.

2. The system of claim 1, wherein the body of the first text message comprises:
   order instructions identifying a product or service being sought by the party;
   delivery instructions identifying a destination address; and
   payment instructions identifying a type of payment method to be used.

3. The system of claim 1, wherein:
   the body of the first text message includes order instructions identifying a product or service being sought by the party; and
   the product or service comprises a wireless personal identification number (PIN) for wireless airtime.

4. The system of claim 1, wherein:
   the body of the first text message includes order instructions identifying a product or service being sought by the party; and
   the product or service comprises a calling card number for calling card minutes.

5. A method of sending and receiving text messages, comprising:
   sending a first text message from a mobile communication device to a text message processing server, the first text message including an identification of information being sought by the party and instructions to manipulate the identified information, wherein the first text message is in short message service (SMS) format;
   when two or more merchants share a common shortcode, identifying a particular merchant by a keyword in a body of the first text message, parsing the first text message to identify the information being sought by the party, generating a request for the identified information and manipulating the identified information in accordance with the instructions, the request being in a format other than a text message format, submitting the request to an information server having access to the identified information, obtaining the identified information as manipulated from the information server, the obtained information being in a format other than a text message format, including the obtained information in a second text message, and sending the second text message back to the mobile communication device; and
   processing and displaying the obtained information on the mobile communication device.

6. The method of claim 5, wherein the body of the first text message includes:
   order instructions identifying a product or service being sought by the party;
   delivery instructions identifying a destination address; and payment instructions identifying a type of payment method to be used.

7. The method of claim 5, wherein:

the body of the first text message includes order instructions identifying a product or service being sought by the party; and the product or service comprises a wireless personal identification number (PIN) for wireless airtime.

8. The method of claim 5, wherein:

the body of the first text message includes order instructions identifying a product or service being sought by the party; and the product or service comprises a calling card number for calling card minutes.

* * * * *